(12) United States Patent
Tanaka et al.

(10) Patent No.: US 7,438,517 B2
(45) Date of Patent: Oct. 21, 2008

(54) TRACTOR

(75) Inventors: Tomiho Tanaka, Tondabayashi (JP); Ryoichi Nishi, Kawachinagano (JP); Akiyoshi Uchijima, Sakai (JP); Naoki Onishi, Kawachinagano (JP); Masataka Takagi, Sakai (JP); Naoya Tsuda, Fujiidera (JP); Kosuke Oyama, Sakai (JP); Arinobu Ishida, Sakai (JP); Shusaku Yamaguchi, Sennan (JP)

(73) Assignee: Kubota Corporation, Osaka (JP)

( * ) Notice: Subject to any disclaimer, the term of this patent is extended or adjusted under 35 U.S.C. 154(b) by 170 days.

(21) Appl. No.: 11/397,939

(22) Filed: Apr. 4, 2006

(65) Prior Publication Data
US 2007/0020068 A1    Jan. 25, 2007

(30) Foreign Application Priority Data
Jun. 23, 2005    (JP)    ............................. 2005-184105
Jun. 23, 2005    (JP)    ............................. 2005-184106

(51) Int. Cl.
*E02F 3/00* (2006.01)
(52) U.S. Cl. .................... 414/680; 180/89.12; 180/315; 296/190.01
(58) Field of Classification Search ................. 414/680, 414/686; 180/89.12, 315, 326; 296/190.01
See application file for complete search history.

(56) References Cited

U.S. PATENT DOCUMENTS

| 6,725,583 | B2 * | 4/2004 | Sprinkle et al. | ............... 37/468 |
| 2003/0042063 | A1 * | 3/2003 | Arthur et al. | ................ 180/315 |

FOREIGN PATENT DOCUMENTS

JP      A-5-46677 U    6/1993

\* cited by examiner

*Primary Examiner*—Donald Underwood
(74) *Attorney, Agent, or Firm*—The Webb Law Firm (57) ABSTRACT

A loader control device for controlling a loader implement attached to a tractor is disposed in a position adjacent a driver's seat and does not obstruct the driver boarding or alighting from the tractor. For this purpose, the tractor includes a vehicle body; a loader implement detachably attached to a front part of the vehicle body; a driver's seat mounted on the vehicle body; a steering device disposed forwardly of the driver's seat; a step laid between the driver's seat and the steering device; rear wheel fenders at opposite lateral positions of the driver's seat; and a shifting unit disposed between the driver's seat and one of the rear wheel fenders; wherein a mounting unit for mounting a loader control device for controlling the loader implement is provided in a forward position of an upper surface of the one of the rear wheel fenders.

10 Claims, 10 Drawing Sheets

TRACTOR

BACKGROUND OF THE INVENTION

1. Field of the Invention

This invention relates to tractors, and particularly to a tractor having a construction for detachably attaching a loader implement, such as a front loader, to the front of a vehicle body.

2. Description of the Related Art

In a known tractor with a loader implement such as a front loader attached to the front part of a vehicle body, a plurality of levers including a main shift lever are arranged at one side of a driver's seat, and a loader control device is disposed forwardly of the main shift lever for controlling the loader implement. According to the tractor disclosed in Japanese Utility Model Application "Kokai" H5-46677 (JP-A-5-46677-U), for example, a rear wheel fender located at one side of a driver's seat has a mounting bracket projecting from a forward end region thereof toward the driver's seat. The mounting bracket supports a support tube attached to a distal end thereof and having a sleeve shaft extending vertically. A bent support rod is inserted in the support tube to be swingable for adjustment. A loader control device is mounted on a distal end of the support rod.

However, with the above loader control device in the prior art, whenever the driver boards or alights from the tractor, the support rod must be swung away from a space that should serve as a boarding and alighting path.

SUMMARY OF THE INVENTION

Having regard to the state of the art noted above, the object of this invention is to provide a tractor that allows a loader control device to be disposed in a position near a driver's seat and not obstructive to boarding or alighting movement of the driver.

The above object is fulfilled, according to this invention, by a tractor comprising:

a vehicle body;

a loader implement detachably attached to a front part of the vehicle body;

a driver's seat mounted on the vehicle body;

a steering device disposed forwardly of the driver's seat;

a step laid between the driver's seat and the steering device;

rear wheel fenders at opposite lateral positions of the driver's seat; and a shifting unit disposed between the driver's seat and one of the rear wheel fenders;

wherein a mounting unit for mounting a loader control device for controlling the loader implement is provided in a forward position of an upper surface of the one of the rear wheel fenders.

According to this construction, the mounting unit is disposed on the upper surface of the rear wheel fender and does not protrude over the step. The loader control device attached to the mounting unit can be in a position adjacent the driver's seat and does not obstruct the driver boarding or alighting from the vehicle body. Further, operation space is not diminished by the presence of the loader control device.

In one preferred embodiment, an entrance is disposed at one lateral end of the step, and the loader control device is disposed in a position rearwardly of the entrance, forwardly of the shifting unit, and laterally outward of a leg position of a driver seated on the driver's seat.

Preferably, the shifting unit includes at least one shift lever, and a change speed guide for guiding the shift lever, and the loader control device is disposed forwardly of the change speed guide, and in an upper-forward position of the one of the rear wheel fenders. With this construction, since the loader control device is disposed in an upper-forward position of the one of the rear wheel fenders, the loader control device does not protrude toward the step, thereby achieving effective use of the operation space.

It is also preferable that the loader control device is detachably attached to a front part of the change speed guide. Then, it is not necessary to remove the change speed guide from the side of the driver's seat when detaching and attaching the loader control device, Thus, the loader control device may be attached and detached with ease.

In one preferred embodiment, the shifting unit includes at least one shift lever, and a change speed guide for guiding the shift lever; the loader control device includes a loader lever, a support for rockably supporting the loader lever, and an device cover for covering the support; and the device cover has a rear portion thereof shaped to follow substantially a shape of a front wall surface of the change speed guide. This construction provides the following advantage.

In the prior art noted hereinbefore, a loader control device is attached to a support rod supported by a mounting bracket projecting from a rear wheel fender, It is therefore impossible to provide the loader control device as integrated with a shifting unit having a plurality of shift levers between the rear wheel fender and the driver's seat. This incurs a possibility of impairing comfort of the operation space.

On the other hand, with the construction according to this invention, the loader lever does not project by a large extent between the driver's seat and the steering device. Further, the device cover is not disposed in a position forwardly of the shifting unit and obstructive to boarding and alighting of the driver or movement of the legs of the seated driver. Consequently, in addition to the loader control device not obstructing the boarding and alighting of the driver, this construction can reliably retain comfort of the operation space.

Since the rear portion of the device cover is shaped to follow substantially the shape of the front wall surface of the change speed guide, the loader control device is snugly fitted to the front part of the change speed guide, and rigidly connected to the shifting unit as integrated with the shifting unit Preferably, the device cover has an outer lateral surface formed to follow substantially a shape of said one of said rear wheel fenders. With this construction, the loader control device is joined snugly with the one of the rear wheel fenders also.

Preferably, the mounting unit comprises a bracket disposed forwardly of the shifting unit and supported by the one of the rear wheel fenders, and the loader lever support includes a connector connected to the bracket. With this construction, the support is supported by the rear wheel fender through the bracket, thereby being given a sufficient resistance to vibration of the vehicle body or action of an external force.

It is preferable that the shift lever includes a main shift lever, and the loader lever has an upward bend portion formed in an intermediate position thereof so that a grip disposed at a distal end of the loader lever is located above the main shift lever.

With this construction, although the loader lever and the main shift lever are arranged close to each other, each does not interfere with operation of the other. Operability of the main shift lever and the loader lever is improved in time of operating these levers continually.

In one preferred embodiment, the loader implement is a front loader having a bucket attached to a distal end thereof, and the loader lever support supports a bucket leveling control lever for switching an automatic horizontal control of the bucket between an operative state and an inoperative state. With this construction, the bucket leveling control lever may be disposed in unison with the loader control device, thereby achieving a reduction in the number of parts and a simplified mounting process.

Further, it is preferable that the vehicle body has a cab mounted in an upper rearward position thereof for enclosing the driver's seat, steering device, shifting unit and loader control device. With this construction, the loader control device is disposed in the above-noted position inside the cab. This achieves effective use of the space in the cab, and improved comfort of this space.

Other features and advantageous effects produced by such features will be apparent from the following description to be read with reference to the accompanying drawings.

DESCRIPTION OF THE PREFERRED EMBODIMENTS

A tractor in a preferred embodiment of this invention will be described hereinafter. In the following description, unless otherwise indicated, the terms fore and aft direction, right and left (transverse) direction and vertical direction refer to those directions with respect to forward movement of the tractor.

Figure 1:
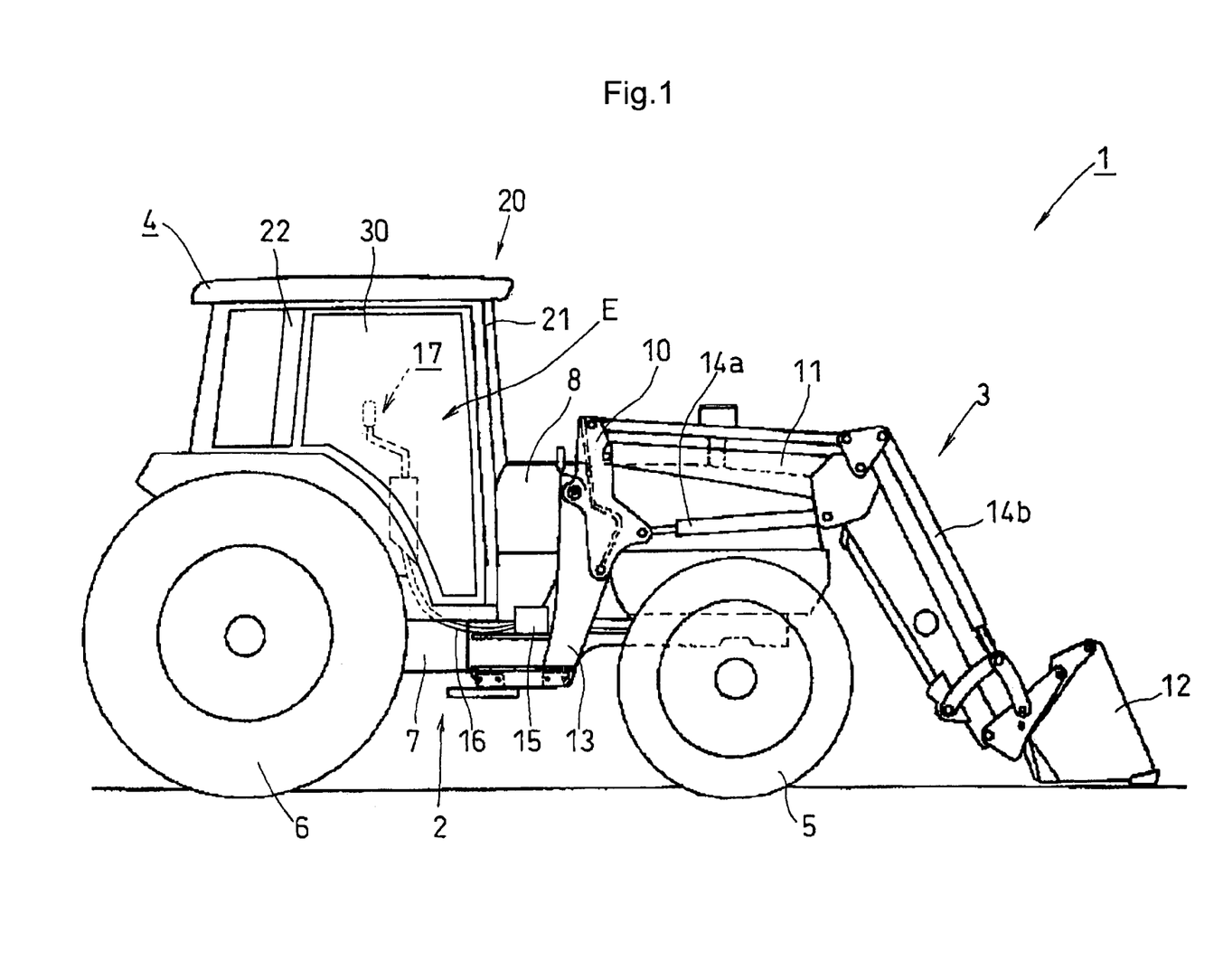
FIG. 1 is a right side elevation of a tractor in one embodiment of this invention, having, attached to the front thereof, a front loader as an example of loader implement.

The tractor 1 shown in FIG. 1 includes a vehicle body 2, a loader implement (front loader in this embodiment) 3 detachably attached to the front of the vehicle body 2, and a cab 4 disposed in a rearward position on the vehicle body 2.

The vehicle body 2 is the two-shaft four-wheel type, and has a pair of right and left front wheels 5 and a pair of right and left rear wheels 6. The front wheels 5 are dirigible as well as drivable, so that this tractor is a four wheel drive tractor. The tractor may be converted to a two wheel drive mode by breaking power transmission to the front wheels 5.

The vehicle body 2 has a construction with a transmission case 7 to the rear of an engine rear through a clutch housing. The engine and engine accessories such as a radiator are covered by an openable hood 8.

The loader implement 3 includes a pair of right and left masts 10 arranged at opposite sides of the hood 8, a pair of right and left booms 11 vertically pivotably attached to upper positions of the masts 10, and a bucket 12 vertically pivotably attached to distal ends of the booms 11. The right and left masts 10 are fixedly attached to mounts 13 fixed to right and left sides of the vehicle body 2. Thus, the loader implement 3 is attachable to and detachable from the vehicle body 2. A boom cylinder 14a is disposed between a vertically intermediate position of the masts 10 and an intermediate position of the booms 11. A bucket cylinder 14b is disposed between the intermediate position of the booms 11 and the back of the bucket 12 for vertically rocking the bucket 12.

These cylinders are in the form of hydraulic cylinders.

A control valve 15 is provided for one of the right and left masts 10 (e.g. the right mast in this embodiment). The control valve 15 is connected to the boom cylinder 14a and bucket cylinder 14b through hydraulic hoses, and connected to a hydraulic pump (not shown) through a hydraulic hose. The control valve 15 is operable by push-pull operation of a spool mounted in a case to supply pressure oil to the boom cylinder 14a and bucket cylinder 14b selectively or simultaneously. The control valve 15 is connected to a wire interlocking device 16. The wire interlocking device 16 is formed of a push-pull wire or Bowden wire, and extends to the cab 4 to be connected to a loader control device 17 disposed in the cab 4.

The cab 4 is supported through mount rubber (not shown) on a support base projecting from the transmission case 7.

Figure 2:
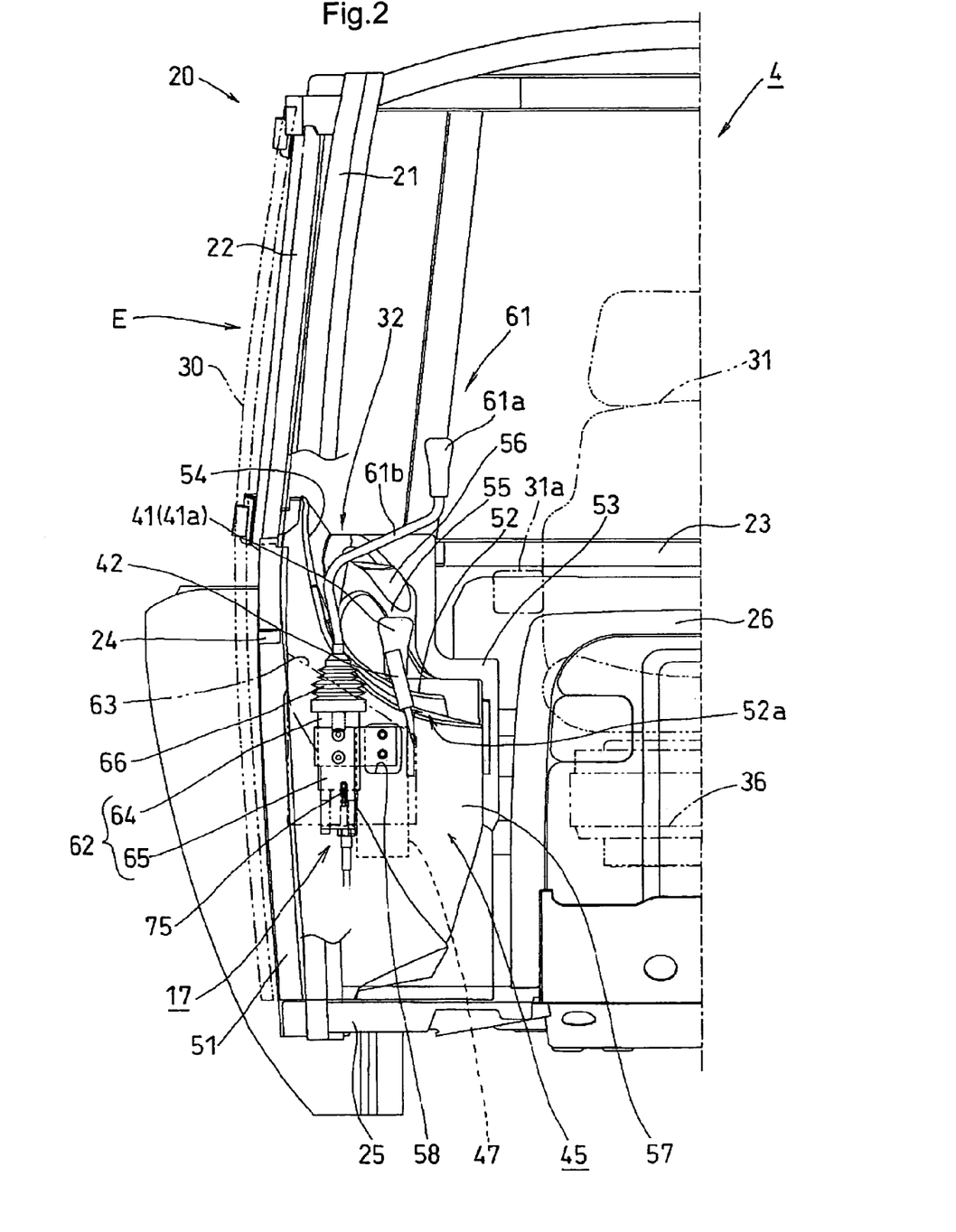
FIG. 2 is a front view showing a right-hand side of a tractor cab.
Figure 3:
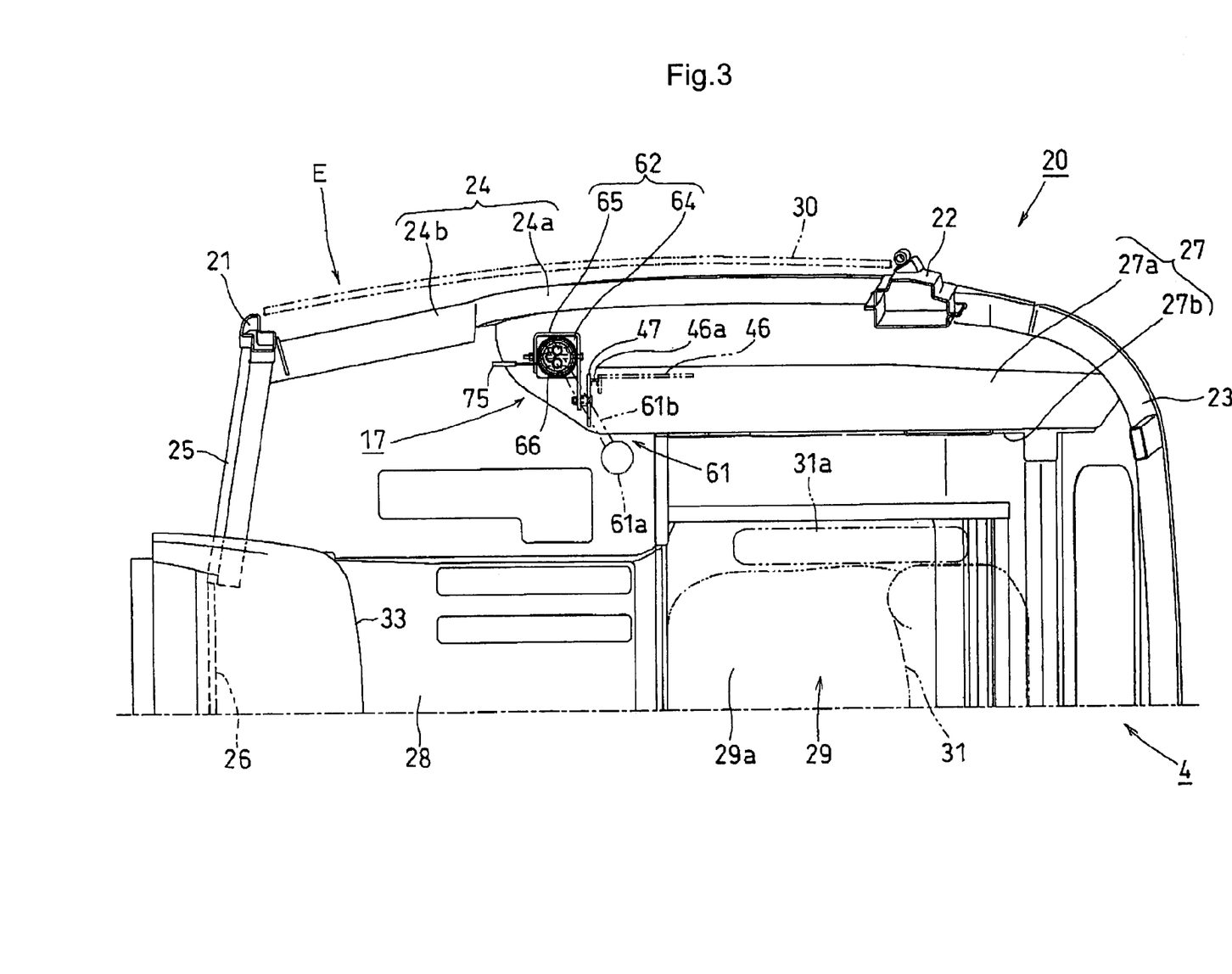
FIG. 3 is a plan view showing the right-hand side of the cab without a change speed guide.

As shown in FIGS. 2 and 3, the cab 4 has a cab frame 20. The cab frame 20 includes a pair of right and left front struts 21 arranged in front positions, a pair of right and left rear struts 22 arranged in rear positions, a rear beam 23 interconnecting lower ends of the right and left rear struts 22, a pair of right and left side beams 24 extending from the lower ends of the right and left rear struts 22 forward and downward to lower ends of the front struts 21, and roof beams (not shown) interconnecting upper ends of the right and left front struts 21 and upper ends of the right and left rear struts 22.

Each of the right and left side beams 24 includes a curved portion 24a curved forward and downward substantially following the rear wheel 6, and a horizontal portion 24b extend from a forward end of the curved portion 24a toward the lower end of the front strut 21. A front beam 25 extends from the lower end of each of the right and left front struts 21 toward the opposite front strut 21.

A plate-like front panel 26 is disposed in a slightly lower position at the middle in the transverse direction between the right and left front struts 21. The front beams 25 are connected to lower ends at opposite sides of the front panel 26, respectively.

A rear wheel fender 27 acting as a mudguard of the rear wheel 6 is connected to the curved portion 24a of each side beam 24. The rear wheel fender 27 includes a curved portion 27a curved along the curved portion 24a of the side beam 24 and covering the rear wheel 6 from an upper rear part to the front, and a side wall 27b connected to the curved portion 27a and opposed to an inward side of the rear wheel 6.

Figure 5:
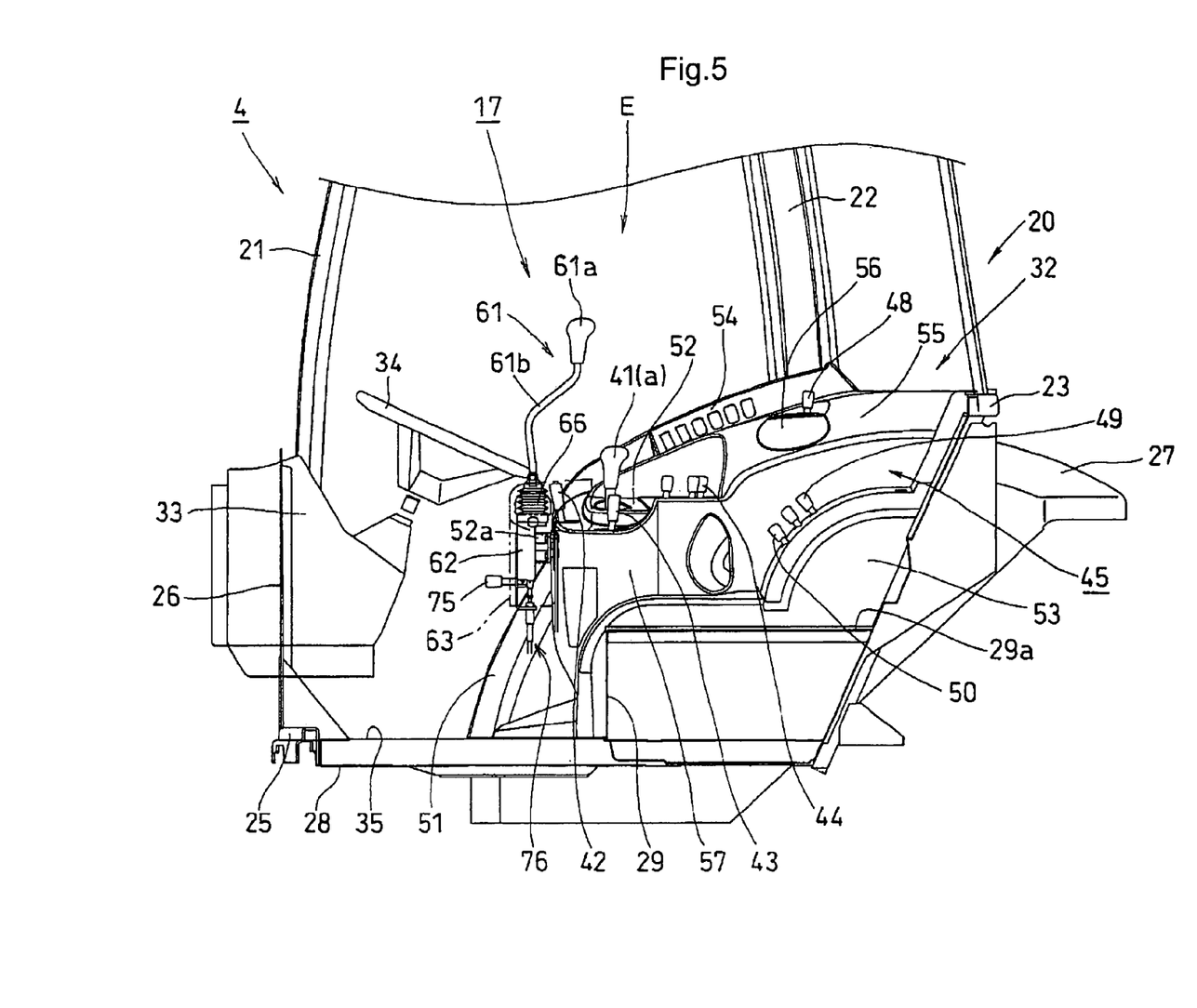
FIG. 5 is a sectional side view showing an interior of the cab where a shifting unit is disposed.

As shown in FIG. 5, the lower end of the front struts 21, front beams 25, side beams 24, front panel 26 and rear wheel fenders 27 are connected to a bottom board 28. A seat board 29 having a flat portion 29a extends upward from a rear position of the bottom board 28.

Figure 4:
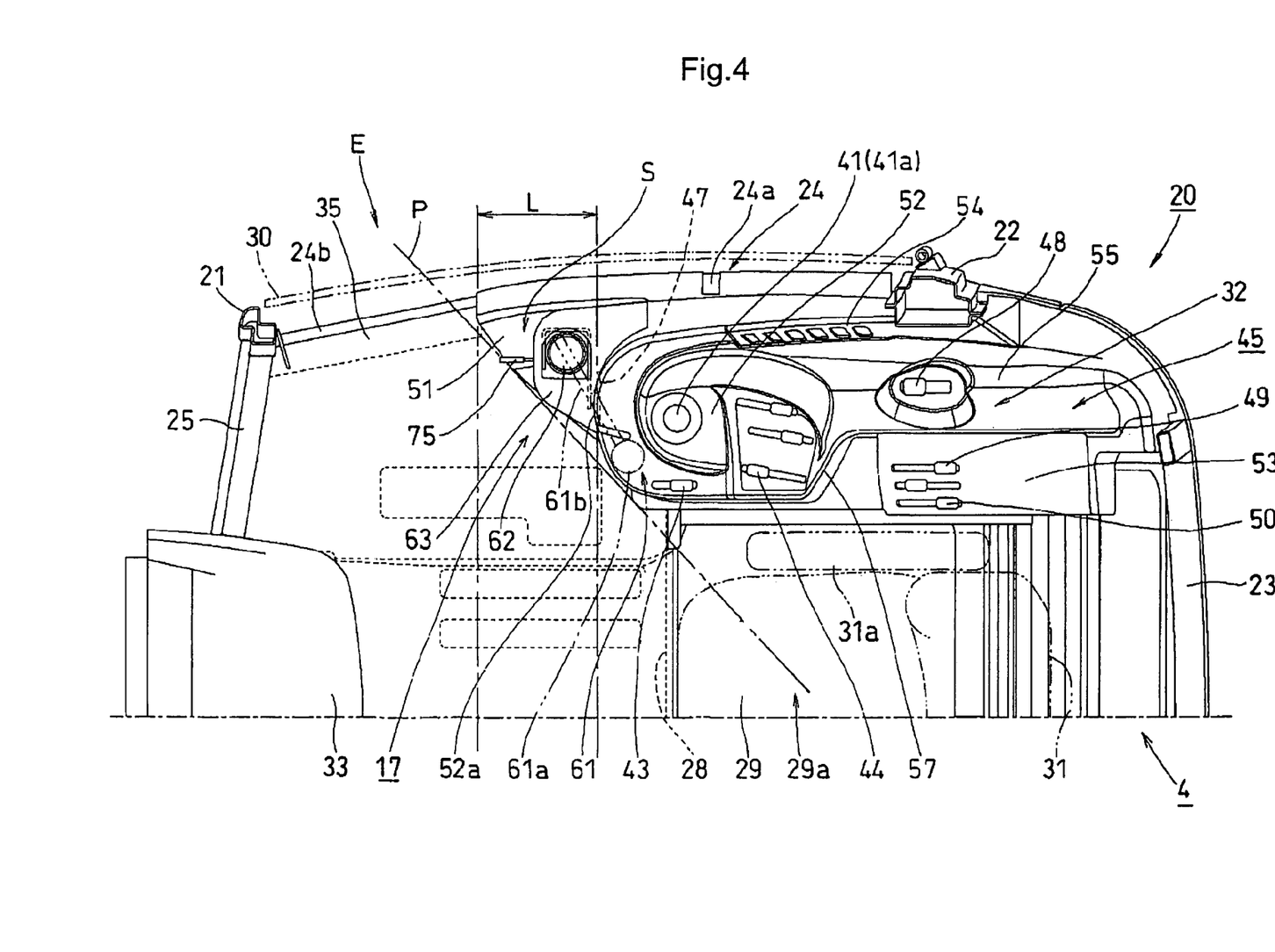
FIG. 4 is a plan view showing the right-hand side of the cab with the change speed guide.

As shown in FIGS. 2 and 4, an entrance doorway E is defined between the front strut 21 and rear strut 22 present at the same side in the right and left direction. A door 30 is disposed between the front strut 21 and rear strut 22 as pivotally supported by the rear strut 22.

As shown in FIGS. 3 and 5, the interior of the cab 4 provides a driver's operating space. In this space, a driver's seat 31 is disposed in an upper rearward position on the vehicle body 2, between the right and left rear wheel fenders 27, and above the seat board 29. A shifting unit 32 is disposed between the driver's seat 31 and right rear wheel fender 27 to extend from the right-hand side of the driver's seat 31 to above the right rear wheel fender 27. A steering device 33 is disposed forwardly of the driver's seat 31. The steering device 33 includes a steering wheel 34 opposed to the driver's seat 31.

As shown in FIG. 4, a step 35 covering the bottom board 28 is laid between the driver's seat 31 and steering device 33. The step 35 disposed between the driver's seats 31 and steering device 33 are connected to the seat board 29 and front panel 26 to cover an area therebetween, and connected to the front beams 25 and rear wheel fenders 27 to cover areas therebetween. The step 35 has lateral ends thereof extending to the entrances E.

As shown in FIG. 2, the driver's seat 31 is mounted through a seat support 36 on the flat portion 29a of the seat board 29 to be rockable toward the right and left entrances E.

As shown in FIGS. 4 and 5, the shifting unit 32 includes a main shift lever 41, an auxiliary shift lever 42, a hand accelerator lever 43 and an auxiliary control lever 44 arranged in a forward portion thereof. These levers 41-44 have proximal portions covered by a change speed guide 45. The levers 41-44 are pivotally supported at proximal ends thereof by a lever pivotal support member 46 (FIG. 3) disposed inside the change speed guide 45 and attached and supported inside the rear wheel fender 27. A plate-like bracket (an example of mounting unit of the loader control device 17) 47 is attached through fittings 46a to the front of the lever pivotal support member 46. This bracket 47 is located in a forward position of an upper surface of the right rear wheel fender 27.

The shifting unit 32 has a PTO lever 48, a position lever 49 and a draft lever 50 arranged in a rear portion thereof. Proximal portions of these levers 48-50 also are covered by the change speed guide 45.

As shown in FIGS. 2, 4 and 5, the change speed guide 45 is formed to cover an area at the right side of the driver's seat 31 from front to rear of the rear wheel fender 27. The change speed guide 45 includes a fender cover portion 51 extending along the curved portion 24a of the side beam 24 and the curved portion 27a of the rear wheel fender 27, and covering the curved portion 24a of the side beam 24 and the rear wheel fender 27; a first lever guide portion 52 for guiding operation of the main shift lever 41, auxiliary shift lever 42, hand accelerator lever 43 and auxiliary control lever 44; and a second lever guide portion 53 for guiding operation of the position lever 49 and draft lever 50.

A switch portion 54 projects upward between the fender cover portion 51 and an outer side of the first lever guide portion 52. The fender cover portion 51 and first lever guide portion 52 are connected through the switch portion 54. An inclined wall 55 is disposed rearwardly of the first lever guide portion 52 to extend to a rear position in the cab 4 along the curved portion 27a of the rear wheel fender 27. The inclined wall 55 is included laterally outward of the dab 4 as it extend upward. A PTO lever guide 56 projects from the inclined wall 55 for guiding the PTO lever 48.

Figure 6:
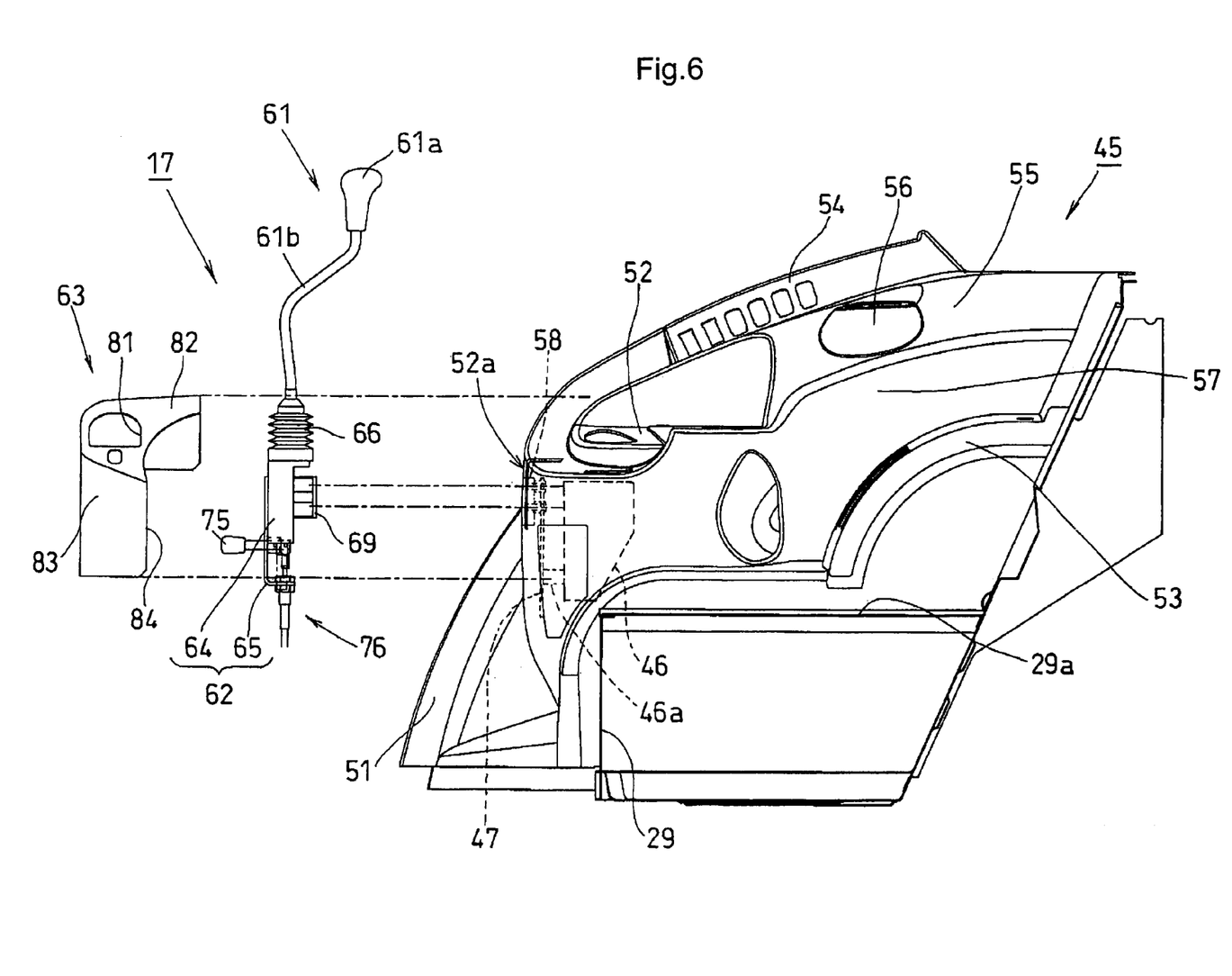
FIG. 6 is an exploded side view showing the change speed guide and a loader control device.

A vertical wall 57 is connected to edges, adjacent the driver's seat, of the first lever guide portion 52 and inclined wall 55, which vertical wall 57 extends toward a lower part of the cab 4 to be opposed to the driver's seat 31. As shown in FIG. 2, the front part of the vertical wall 57 extends laterally outward of the cab, curving to follow the shape of the edge of the first lever guide portion 52, to be connected to the fender cover portion 51 and switch portion 54. As shown in FIG. 6, the rear part of the vertical wall 57 curves laterally outward of the cab 4, in a position rearwardly of the first lever guide portion 52, to be connected to the inclined wall 55, and connected to the second lever guide portion 53 curved forwardly of the cab 4 as it extends forwardly of the cab 4.

As shown in FIG. 4, the first lever guide portion 52 is formed in the shape of a convex arc projecting forward in the cab 4. The first lever guide 52 has a forward end of its edge 52a located in a position shifted by a distance L rearward from a forward end of the fender cover portion 51. This edge 52a extends laterally outward of the cab 4 to be located above the fender cover portion 51 in plan view, to be connected to the switch portion 54, and extends toward the driver's seat 31 and rearward in the cab 4 while projecting slightly above the step 35. Consequently, the first lever guide 52 is located further rearward in the cab 4 than a straight line P, in FIG. 4, linking the rear end of the entrance E and the driver's seat 31.

As shown in FIG. 6, the lever pivotal support member 46 is located below the first lever guide 52. As shown in FIG. 2, the vertical wall 57 has a closable opening 58 opposed to the bracket 47 in a position at a lower front of the first lever guide 52.

The straight line P shown in FIG. 4 may be regarded also as an outermost edge of a leg position when the driver is seated on the driver's seat 31. Thus, the first lever guide 52 is located in a position rearwardly of the entrance E and laterally outward of the leg position of the driver seated on the driver's seat 31. Forwardly of the first lever guide 52, space S is formed that is above the rear wheel fender 27, and substantially follows a side edge of the step 35.

It is in this space S that the loader control device 17 is disposed for controlling the loader implement 3.

The loader control device 17 is of a cassette type attachable to and detachable from the vehicle body 2. As shown in FIG. 6, the loader control device 17 includes a loader lever 61, a support 62 for rockably supporting the loader lever 61, and a device cover 63 for guiding operation of the loader lever 61 and covering the support 62. As shown in FIG. 1, the loader control device 17 is connected to the control valve 15 through the wire interlocking device 16.

Figure 7:
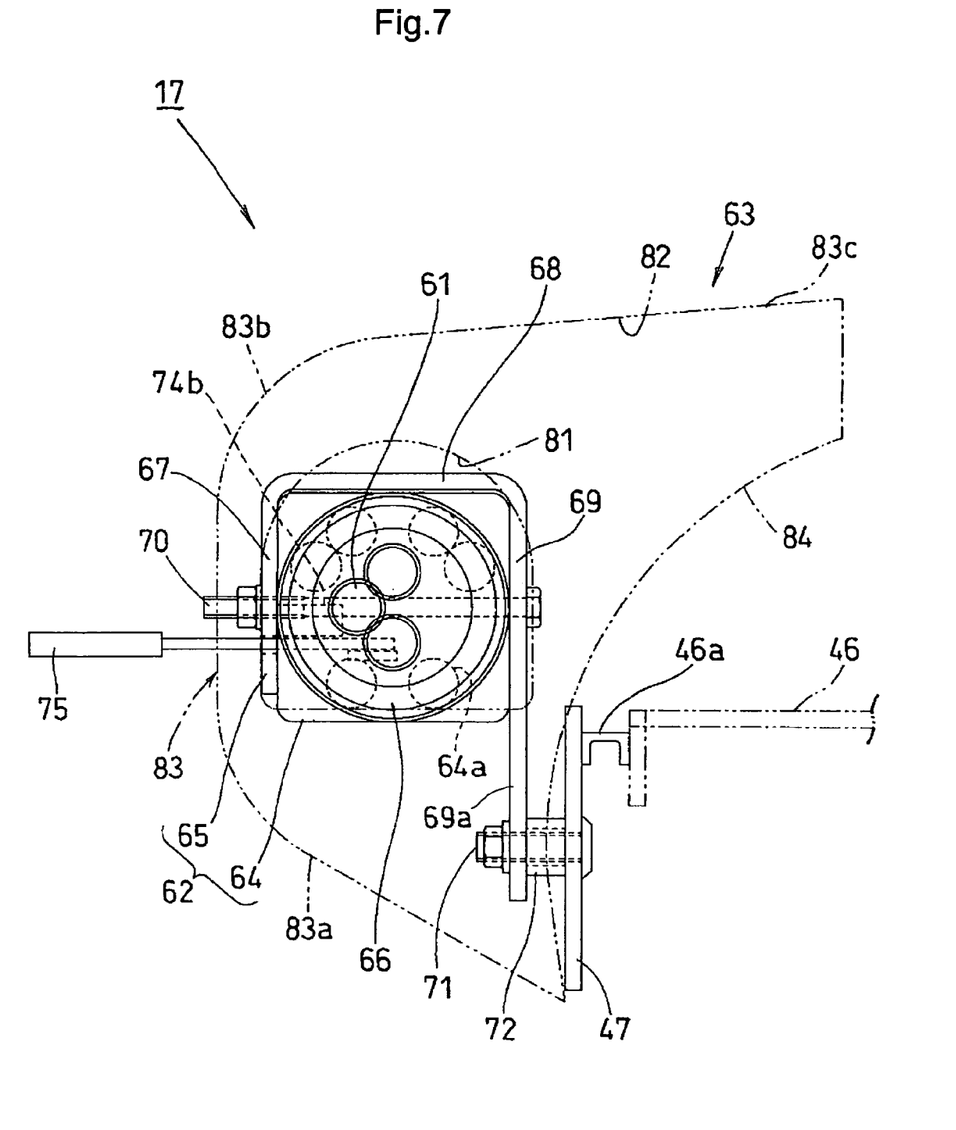
FIG. 7 is a plan view of the loader control device.
Figure 8:
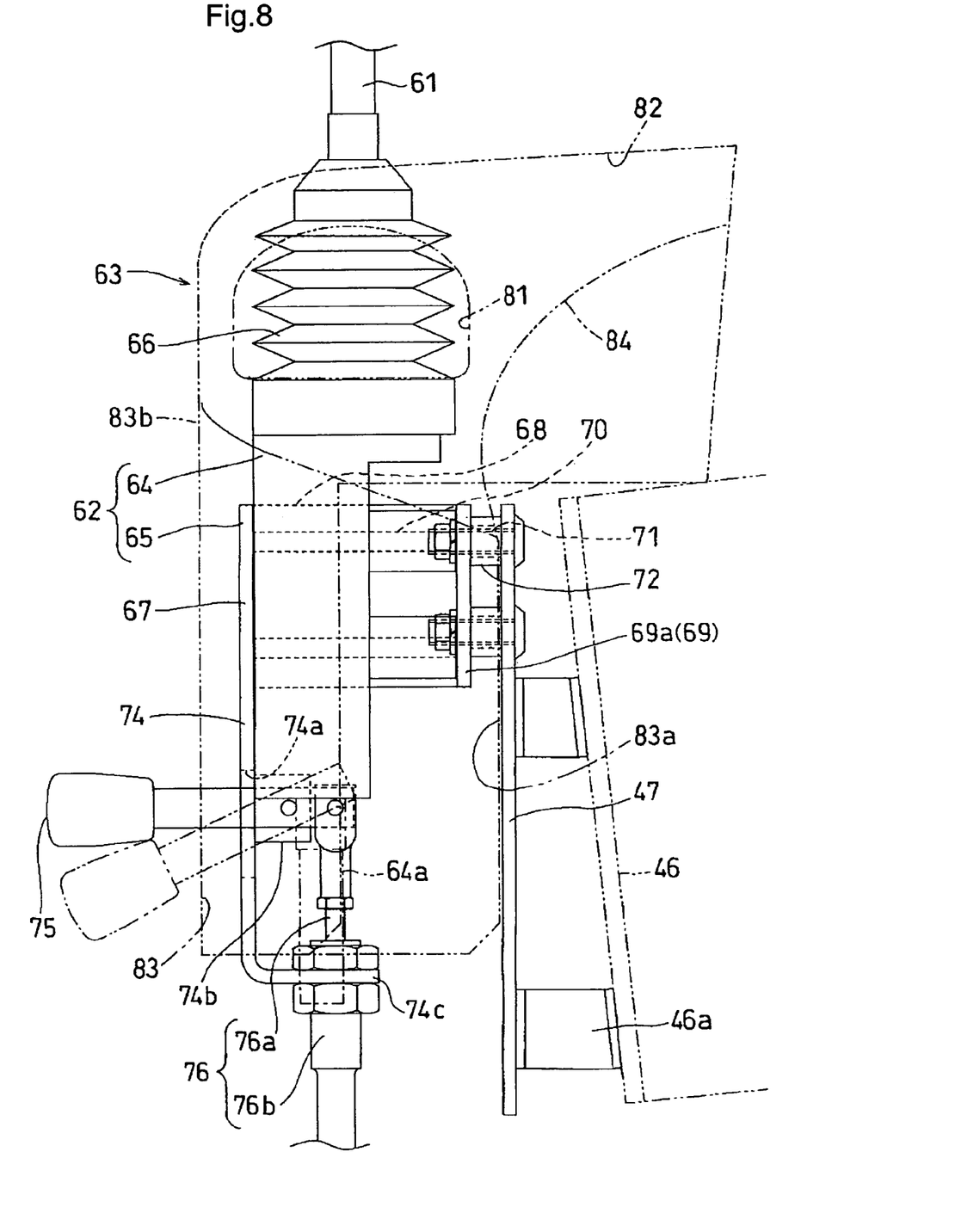
FIG. 8 is a left-hand side view of the loader control device.
Figure 9:
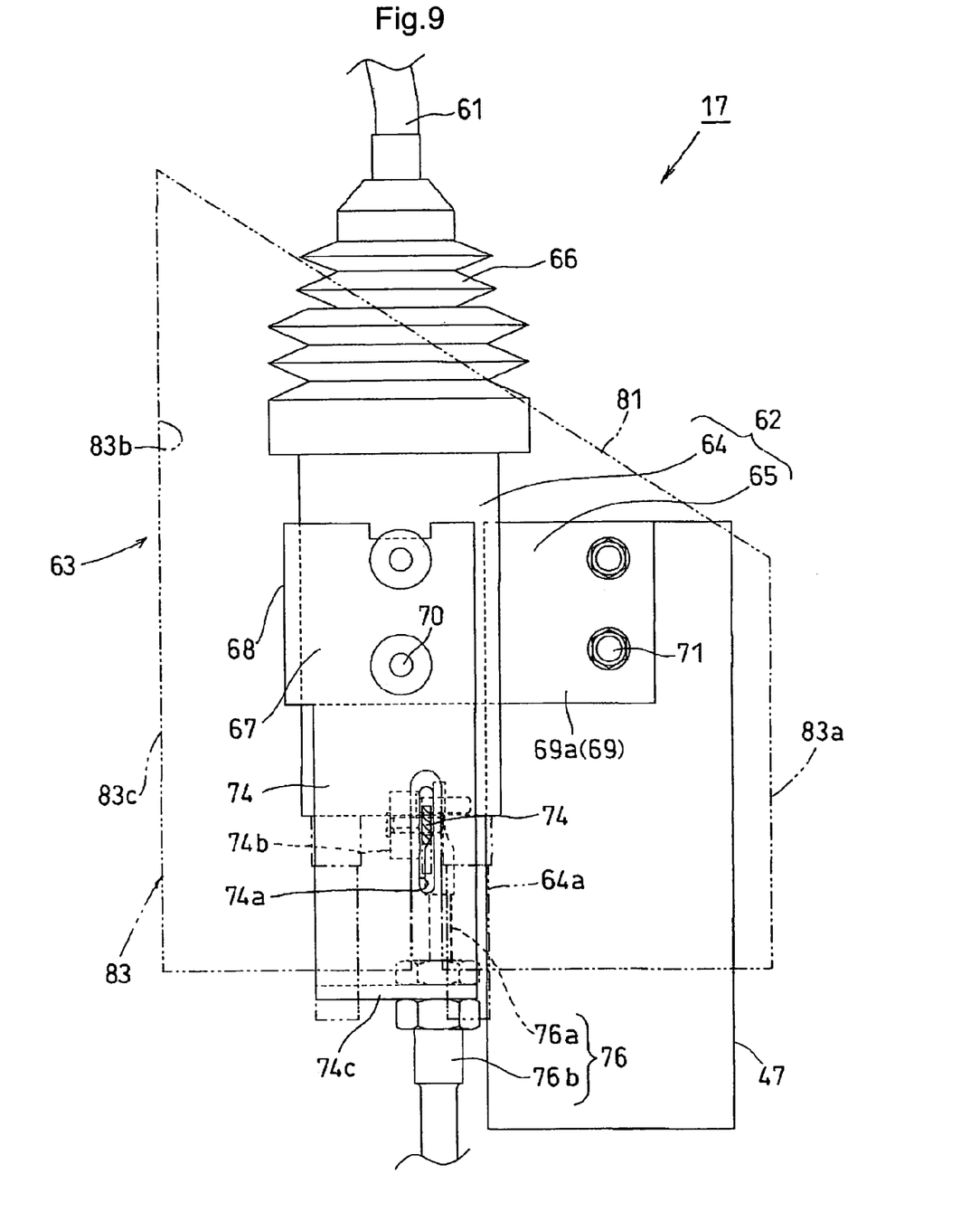
FIG. 9 is a front view of the loader control device.

As shown in FIGS. 7 through 9, the support 62 includes a case 64 housing a support mechanism for the loader lever 61 and a transfer mechanism for transmitting operation of the loader lever 61 to the wire interlocking device 16, and a support frame 65 for supporting the case 64. The case 64 is in the form of a rectangular parallelepiped extending in the vertical direction. The loader lever 61 projects upward from the upper end of the case 64. The case 64 has a connector 64a disposed at the lower end thereof for connecting the wire interlocking device 16. The upper end of the case 64 and the proximal end of the loader lever 61 are covered by a bellows 66 expandable and contractible with operation of the loader lever 61.

The support frame 65 is formed by bending sheet metal, and has a front plate portion 67 opposed to the front of the case 64, a side plate portion 68 opposed to a side surface of the case 64 facing laterally outwardly of the cab 4, and a rear plate portion 69 opposed to the rear of the case 64. The case 64 is fitted in the support frame 65, with the front thereof in contact with the front plate portion 67 and the above side surface in contact with the side plate portion 68. The case 64 is supported by the support frame 65 by means of a fastening device such as bolts 70 extending from the front plate portion 67 to the rear plate portion 69. Bushes are mounted on the fastening device 70 between the rear of the case 64 and the rear plate portion 69 of the support frame 65.

As shown in FIGS. 7 and 9, the rear plate portion 69 of the support frame 65 has a connecting portion 69a extending toward the driver's seat 31. The connecting portion 69a is supported by a bracket 73 through a fastening device such as bolts 71 and bushes 72. Consequently, the support 62 is supported by the rear wheel fender 27 through the bracket 73 and lever pivotal support member 46.

As shown in FIGS. 8 and 9, the support frame 65 has a depending plate portion 74 extending downward in the cab 4 from a lower edge of the front plate portion 67. The depending plate portion 74 rockably supports a bucket leveling control lever 75 for switching a bucket leveling device (not shown) on and off. The bucket leveling device serves to control the position of the bucket 12 raised by the booms 11, and maintain the bucket 12 horizontal with its opening turned up in order to carry, without spilling, earth and sand scooped up with the bucket 12. The bucket leveling device is connected to the bucket leveling control lever 75 through a push-pull cable 76.

The depending plate portion 74 of the support frame 65 has a slot 74a formed in a vertically intermediate position thereof to extend vertically, and a projection 74b formed on a rear surface thereof adjacent the slot 74a. The bucket leveling control lever 75 extends through the slot 74a, and is rockably supported in an intermediation position by the projection 74b. A cable 76a of the push-pull cable 76 is attached to the rear end of the bucket leveling control lever 75. An outer tube 76b of the push-pull cable 76 is supported by bent portion 74c formed by bending the lower end of the depending plate portion 74 at the right angle rearward.

Thus, the bucket leveling control lever 75 is disposed to project forward from the support frame 65 to be vertically rockable. When the bucket leveling control lever 75 is pulled up, the bucket leveling device is turned off, whereby the horizontal control mechanism for the bucket 12 does not operate. On the other hand, when the bucket leveling control lever 75 is pulled down, the bucket leveling device is turned on, whereby the bucket 12 in operation is maintained in the horizontal position.

Figure 10:
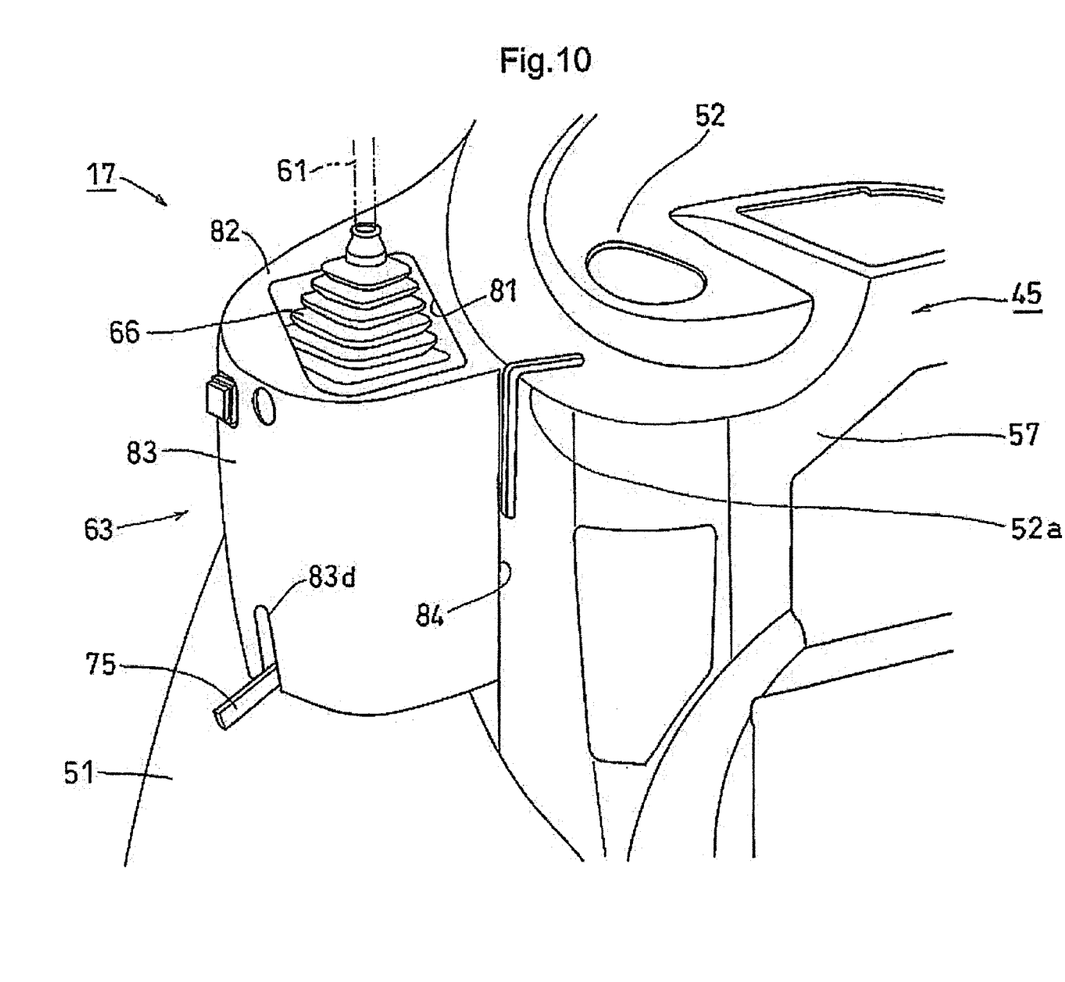
FIG. 10 is a perspective view showing the loader control device and adjacent components.

As shown in FIGS. 5 and 10, the-device cover 63 is formed to cover the front and opposite sides of the support 62. The device cover 63 includes an upper surface 82 defining an opening 81 for exposing an upper part of support 62 and the bellows 66, a side surface 83 covering the support 62 from the side adjacent the driver's seat to the front and the side facing outwardly of the cab 4, and a rear portion 84 cut out in a recessed arcuate form substantially following the vertical wall 57 of the first lever guide 52 of the change speed guide 45. The device cover 63 is connected to the first lever guide 52 of the change speed guide 45 by fitting the rear portion 84 on the vertical wall 57.

The upper surface 82 of the device cover 63 is inclined downward toward the driver's seat 31, and arcuately protruding forward in the cab 4 as shown in FIG. 4. The edge of the upper surface 82 extends along the straight line P, noted hereinbefore, and forward from an end of the driver's seat 31, curves in a forwardly protruding arcuate form toward the side of the cab 4, and extends rearward along the side of the cab 4 and rearward along an outer side edge of the fender cover portion 51 of the shifting unit 32.

The side surface 83 of the device cover 63 extends substantially vertically downward from the edge of the upper surface 82. The side surface 83 has an inward side surface portion 83a extending along the step 35 in plan view, and a front surface portion 83b and an outward side surface portion 83c extending outward in the cab 4 from a forward end of the inward side surface 83a and substantially along an upper forward part of the inner surface of the fender cover portion 51 of the change speed guide 45. The front surface portion 83b of the side surface 83 has a cutout 83d formed in a position opposed to the slot 74a of the depending plate portion 74 of the support frame 65 for receiving the bucket leveling control lever 75.

The cutout 83d has a lower end thereof connected to the lower edge of the front surface portion 83b.

The loader lever 61 has a grip 61a at the upper end thereof, and a bent portion 61b formed in an intermediate position thereof and bent upward so that the grip 61a is located above the main shift lever 41. With the bent portion 61b formed in the intermediate position of the loader lever 61, the loader lever 61 extends around a working range of the main shift lever 41 such that the grip 61a of the loader lever 61 is located above a grip 41a of the main shift lever 41. Consequently, one of the main shift lever 41 and loader lever 61 never interferes with operation of the other.

In assembling the loader control device 17 to the shifting unit 32, as shown in FIG. 6, the opening 58 of the vertical wall portion 57 of the first lever guide 52 of the change speed guide 45 is opened first, and the support 62 is placed opposite the bracket 47 inside the change speed guide 45 through the opening 58. Then, the rear plate portion 69 of the support frame 65 of the support 62 is fixed to the bracket 47 through the bushes 72, thereby attaching the support 62 to the front of the change speed guide 45.

Next, the device cover 63 for covering the support 62 is attached. At this time, as shown in FIGS. 4 and 5, the rear portion 84 of the device cover 63 is fitted on the vertical wall 57 of the first lever guide 52 of the change speed guide 45, and the side surface 83 of the device cover 63 is attached to the device cover 63 to extend along the inner surface of the fender cover portion 51, whereby the device cover 63 is snugly connected to the change speed guide 45. Consequently, the support 62 and device cover 63 of the loader control device 17 are contained in the space S, and rigidly connected to the change speed guide 45.

Since the cutout 83d formed in the front surface portion 83b of the side surface 83 of the device cover 63 is connected to the lower edge of the front surface portion 83b, the bucket leveling control lever 75 attached to the support 62 may be inserted from the lower end of the cutout 83d. Thus, the bucket leveling control lever 75 may be assembled to the support 62 before attaching the device cover 63, which facilitates attachment to the support 62 of the bucket leveling control lever 75. In addition, when loader control device 17 is detached, the device cover 63 may be detached from the support 62 without detaching the bucket leveling control lever 75 from the support 62. Thus, attachment and detachment of the device cover 63 may be carried out in a simple and convenient manner.

Although the device cover 63 is attached to the support 62 by means of the fastening device such as bolts, the device cover 63 may be fixed to the change speed guide 45.

With the loader lever 61 attached to the support 62, the loader control device 17, as shown in FIG. 4, is located in a position forwardly of the shifting unit 32, rearwardly of the entrance E disposed at the end of step 35, and laterally outward of the leg position of the driver seated on the driver's seat 31.

As shown in FIGS. 2 and 4, the grip 61a of the loader lever 61 is located forwardly of the main shift lever 41 in plan view, and above the main shift lever 41 and auxiliary shift lever 42 in front view. Although the loader lever 61 and main shift lever 41 are arranged adjacent each other, one of these levers does not interfere with operation of the other lever.

According to this invention, the bracket 47 acting as a mount of the loader control device 17 is disposed in an upper-forward position of one rear wheel fender (i.e. the right rear wheel fender in this embodiment) 27. The loader control device 17 attached to this bracket 47 is contained in the space S present above and in an upper-forward position of the one rear wheel fender 27, and forwardly of the first lever guide 52 of the change speed guide 45. The space S is provided above the rear wheel fender 27 without protruding above the step 35. The loader control device 17 contained in the space S presents no obstruction to movement of the driver back and forth between the entrance E and driver's seats 31 or to movement of the legs of the driver seated on the driver's seat 31.

The loader control device 17 disposed in the above-noted space S incurs no possibility of substantially diminishing the operation space in the cab 4, compared with the case of excluding the loader control device 17. Thus, even with the presence of the loader control device 17, comfort of the operation space is maintained.

Moreover, the device cover 63 of the loader control device 17 is snugly connected to the first lever guide 52 and fender cover portion 51 of the change speed guide 45. Thus, the loader control device 17 is connected to the shifting unit 32 without incongruity, promoting unity of the cassette-type loader control device 17 with the shifting unit 32 provided beforehand in the cab 4. This provides improved comfort of the operation space in the cab 4, and facilitates operation by the driver.

As shown in FIG. 2, the grip 41a of the main shift lever 41 is disposed below and obliquely forwardly of an armrest 31a of the driver's seat 31 to be operable by the driver having an elbow on the armrest 31a. The loader control device 17 has the grip 61a of the loader lever 61 disposed above the main shift lever 41. The driver can therefore operate also the loader lever 61 while having the elbow placed on the armrest 31a. Thus, fatigue of the driver is drastically reduced when operating these two levers continually.

The foregoing embodiment has particularly been described in which this invention is applied to the tractor 1. However, this invention is not limited to the foregoing embodiment. For example, the loader implement 3 may be attached to the front of the vehicle body 2 not to be detachable therefrom, and the loader control device 17 unremovably mounted inside the cab 4. However, it is desirable to provide the loader control device 17 and loader implement 3 in the attachable and detachable form, and sell the two components as a set. Of course, it is also possible to sell separately the loader control device 17 and loader implement 3.

While the change speed guide 45 is formed as an integral unit, the fender cover portion 51, first lever guide 52 and second lever guide 53 may be offered as separate components, which may be assembled together for use. The plurality of levers of the shifting unit 32, and the positional relationship between the plurality of levers and the loader lever 61, may be varied as appropriate according to actual working conditions, or the shape of shifting unit 32.

The shifting unit 32 may also be disposed at the left side of the driver's seat 31. The doors 30 may be pivotally supported by the front struts 21 to be openable and closable.

The described embodiment employs the tractor 1 having the cab 4. The same advantages may be obtained by applying the invention to a tractor having a rollover protection structure (ROPS) instead of the cab 4, with the shifting unit 32 disposed between the driver's seat 31 and rear wheel fender 27.

What is claimed is:

1. A tractor comprising:
   a vehicle body;
   a loader implement detachably attached to a front part of said vehicle body;
   a driver's seat mounted on said vehicle body;
   a steering device disposed forwardly of said driver's seat;
   a step laid between said driver's seat and said steering device;
   rear wheel fenders at opposite lateral positions of said driver's seat; and
   a shifting unit and a loader control device associated with one of said rear wheel fenders;
   wherein said shifting unit includes a cover extending rearward from a front end of said one of said rear wheel fenders and along a curved portion of said one of said rear wheel fenders so as to substantially cover said one of said rear wheel fenders; and wherein said cover includes a vertical wall at a forward position thereof, said loader control device being detachably attached to said wall without protruding above said step.

2. A tractor as defined in claim 1, wherein:
   an entrance is disposed at one lateral end of said step; and
   said loader control device is disposed in a position rearwardly of said entrance, forwardly of said shifting unit, and laterally outward of a leg position of a driver seated on said driver's seat.

3. A tractor as defined in claim 1, wherein:
   said shifting unit includes at least one shift lever, and a change speed guide for guiding said shift lever; and
   said loader control device is disposed forwardly of said change speed guide, and in an upper-forward position of said one of said rear wheel fenders.

4. A tractor as defined in claim 3, wherein said change speed guide comprises said cover such that said loader control device is detachably attached to a front part of said change speed guide.

5. A tractor as defined in claim 1, wherein:
   said shifting unit includes at least one shift lever, and a change speed guide for guiding said shift lever;
   said loader control device includes a loader lever, a support for rockably supporting said loader lever, and an device cover for covering said support; and
   said device cover has a rear portion thereof shaped to follow substantially a shape of a front wall surface of said change speed guide.

6. A tractor as defined in claim 5, wherein said device cover has an outer lateral surface formed to follow substantially a shape of said one of said rear wheel fenders.

7. A tractor as defined in claim 5, further comprising:
   a mounting unit for detachably attaching said loader control device thereto, said mounting unit comprising a bracket disposed forwardly of said vertical wall of said cover and supported by said one of said rear wheel fenders; and
   wherein said loader lever support includes a connector connected to said bracket.

8. A tractor as defined in claim 5, wherein:
   said shift lever includes a main shift lever; and
   said loader lever has an upward bend portion formed in an intermediate position thereof so that a grip disposed at a distal end of said loader lever is located above said main shift lever.

9. A tractor as defined in claim 1, wherein:
   said loader implement is a front loader having a bucket attached to a distal end thereof; and
   said loader lever support supports a bucket leveling control lever for switching an automatic horizontal control of said bucket between an operative state and an inoperative state.

10. A tractor as defined in claim 1, wherein said vehicle body has a cab mounted in an upper rearward position thereof for enclosing said driver's seat, said steering device, said shifting unit and said loader control device.

* * * * *